United States Patent [19]
Suzuki et al.

[11] Patent Number: 5,894,359
[45] Date of Patent: Apr. 13, 1999

[54] COLOR FILTER AND COLOR DISPLAY APPARATUS

[75] Inventors: Tetsuji Suzuki; Hirofumi Imaoka, both of Yokosuka; Itsuo Takanashi, Kamakura; Shintaro Nakagaki, Miura, all of Japan

[73] Assignee: Victor Company of Japan, Ltd., Yokohama, Japan

[21] Appl. No.: 08/701,171

[22] Filed: Aug. 21, 1996

[51] Int. Cl.$^6$ .................................................. G02B 5/32
[52] U.S. Cl. .............................. 359/15; 359/22; 359/24; 349/5; 349/62
[58] Field of Search ........................ 359/1, 15, 22, 359/24, 25; 349/5, 62, 73, 70, 80, 104, 106

[56] References Cited

U.S. PATENT DOCUMENTS

| | | |
|---|---|---|
| 4,807,978 | 2/1989 | Grinberg et al. |
| 5,506,701 | 4/1996 | Ichikawa ................. 359/15 |
| 5,548,349 | 8/1996 | Mizuguchi et al. ....... 349/5 |
| 5,633,737 | 5/1997 | Tanaka et al. ............ 349/5 |

FOREIGN PATENT DOCUMENTS

| | | |
|---|---|---|
| 0465171 | 1/1992 | European Pat. Off. |
| 0583150 | 2/1994 | European Pat. Off. |
| 0692730 | 1/1996 | European Pat. Off. |
| 6-281932 | 10/1994 | Japan |
| 6308332 | 11/1994 | Japan |
| 7-077609 | 3/1995 | Japan |
| 2152724 | 8/1985 | United Kingdom |
| 9209915 | 6/1992 | WIPO |
| 9522773 | 8/1995 | WIPO |

*Primary Examiner*—Cassandra Spyrou
*Assistant Examiner*—Darren E. Schuberg
*Attorney, Agent, or Firm*—Pollock, Vande Sande & Amernick

[57] ABSTRACT

A color filter includes a plurality of color pixels, and a first hologram diffracting an incident light beam into a first diffraction-resultant light beam. The color filter also includes a second hologram diffracting the first diffraction-resultant light beam into a second diffraction-resultant light beam having a plurality of light beams with different wavelengths respectively. The second hologram directs the different wavelength light beams toward the color pixels respectively.

5 Claims, 12 Drawing Sheets

COLOR FILTER AND COLOR DISPLAY APPARATUS

BACKGROUND OF THE INVENTION

1. Field of the Invention

This invention relates to a color filter which can be used for various apparatuses such as an image input unit of a camera and an image output unit of a display. This invention also relates to a color display apparatus.

2. Description of the Prior Art

A known color filter includes a hologram and a plate having an array of primary color pixels. The hologram and the color pixel array plate are spaced from and parallel to each other. In the known color filter, a light source applies a white light beam to the hologram. The white light beam is diffracted and is separated into a red light beam, a green light beam, and a blue light beam when passing through the hologram. The red light beam, the green light beam, and the blue light beam are focused on a red pixel, a green pixel, and a blue pixel in the color pixel array plate respectively, undergoing modulation and passing through the color pixel array plate. The red light beam, the green light beam, and the blue light beam which have passed through the color pixel array plate form an indicated color image.

In the known color filter, the red light beam, the green light beam, and the blue light beam are incident to the red pixel, the green pixel, and the blue pixel in the color pixel array plate at different angles respectively. These angles of incidence do not correspond to a right angle. Specifically, the paths of the red light beam, the green light beam, and the blue light beam tend to be considerably slant with respect to the color pixel array plate. Accordingly, the known color filter tends to be low in efficiency of use of light.

SUMMARY OF THE INVENTION

It is a first object of this invention to provide an improved color filter.

It is a second object of this invention to provide an improved color display apparatus.

A first aspect of this invention provides a color filter comprising a plurality of color pixels; a first hologram diffracting an incident light beam into a first diffraction-resultant light beam; and a second hologram diffracting the first diffraction-resultant light beam into a second diffraction-resultant light beam having a plurality of light beams with different wavelengths respectively, the second hologram directing the different wavelength light beams toward the color pixels respectively.

A second aspect of this invention is based on the first aspect thereof, and provides a color filter wherein the first hologram has a diffraction efficiency independent of or slightly dependent on a wavelength of the incident light beam.

A third aspect of this invention is based on the first aspect thereof, and provides a color filter wherein the first hologram has a plurality of different holographic patterns with diffraction efficiencies depending on a wavelength of the incident light beam.

A fourth aspect of this invention is based on the first aspect thereof, and provides a color filter wherein the second hologram has a plurality of different holographic patterns with diffraction efficiencies depending on a wavelength of the incident light beam.

A fifth aspect of this invention is based on the first aspect thereof, and provides a color filter further comprising means for limiting a wavelength band of the incident light beam before the incident light beam meets the first hologram.

A sixth aspect of this invention is based on the fifth aspect thereof, and provides a color filter wherein said means comprises dichroic mirrors.

A seventh aspect of this invention provides a color display apparatus comprising a light source emitting a light beam; first means for separating the light beam emitted from the light source into first, second, and third light beams having first, second, and third primary colors respectively; a spatial light modulation device exposed to the first, second, and third light beams generated by the first means, the spatial light modulation device modulating the first, second, and third light beams into first, second, and third modulation-resultant light beams respectively; and second means for projecting the first, second, and third modulation-resultant light beams generated by the spatial light modulation device into a color image; wherein the spatial light modulation device comprises i) first, second, and third pixels related to the first, second, and third primary colors respectively; ii) a first hologram diffracting the first, second, and third light beams generated by the first means into first, second, and third diffraction-resultant light beams respectively; and iii) a second hologram diffracting the first, second, and third diffraction-resultant light beams into fourth, fifth, and sixth diffraction-resultant light beams respectively, the second hologram directing the fourth, fifth, and sixth diffraction-resultant light beams toward the first, second, and third pixels respectively.

An eighth aspect of this invention is based on the seventh aspect thereof, and provides a color display apparatus wherein the first means comprises first, second, and third dichroic mirrors which reflect first, second, and third components of the light beam emitted from the light source which have the first, second, and third primary colors respectively.

A ninth aspect of this invention provides a color display apparatus comprising a light source emitting a light beam; first means for separating the light beam emitted from the light source into first, second, and third light beams having first, second, and third primary colors respectively; a spatial light modulation device exposed to the first, second, and third light beams generated by the first means, the spatial light modulation device modulating the first, second, and third light beams into first, second, and third modulation-resultant light beams respectively; and second means for projecting the first, second, and third modulation-resultant light beams generated by the spatial light modulation device into a color image; wherein the spatial light modulation device comprises i) a first electrode being transparent and being exposed to the first, second, and third light beams generated by the first means; ii) a second electrode including first, second, and third pixel electrodes related to the first, second, and third primary colors respectively; iii) a light modulation layer extending between the first electrode and the second electrode; iv) an array of micro lenses focusing the first, second, and third light beams generated by the first means on the first, second, and third pixel electrodes respectively; and v) third means located between the micro lens array and the second electrode for deflecting the first, second, and third light beams outputted from the micro lens array in substantially normal directions with respect to the first, second, and third pixel electrodes respectively.

A tenth aspect of this invention provides a color display apparatus comprising a light source emitting a light beam; a hologram diffracting the light beam emitted from the light source and thereby separating the light beam emitted from the light source into first, second, and third light beams having first, second, and third primary colors respectively; a spatial light modulation device exposed to the first, second, and third light beams generated by the hologram, the spatial light modulation device modulating the first, second, and third light beams into first, second, and third modulation-resultant light beams respectively; and first means for projecting the first, second, and third modulation-resultant light beams generated by the spatial light modulation device into a color image; wherein the spatial light modulation device comprises i) a first electrode being transparent and being exposed to the first, second, and third light beams generated by the hologram; ii) a second electrode including first, second, and third pixel electrodes related to the first, second, and third primary colors respectively; iii) a light modulation layer extending between the first electrode and the second electrode; iv) an array of micro lenses focusing the first, second, and third light beams generated by the hologram on the first, second, and third pixel electrodes respectively; and v) second means located between the micro lens array and the second electrode for deflecting the first, second, and third light beams outputted from the micro lens array in substantially normal directions with respect to the first, second, and third pixel electrodes respectively.

An eleventh aspect of this invention is based on the ninth aspect thereof, and provides a color display apparatus wherein the third means comprises a hologram.

A twelfth aspect of this invention is based on the ninth aspect thereof, and provides a color display apparatus wherein the third means comprises a micro lens.

A thirteenth aspect of this invention is based on the ninth aspect thereof, and provides a color display apparatus wherein the third means comprises a micro prism.

A fourteenth aspect of this invention provides a color display apparatus comprising a light source emitting a light beam; a spatial light modulation device exposed to the light beam emitted from the light source, the spatial light modulation device modulating the light beam emitted from the light source into a modulation-resultant light beam; and first means for projecting the modulation-resultant light beam generated by the spatial light modulation device into a color image; wherein the spatial light modulation device comprises i) a first electrode being transparent and being exposed to the first, second, and third light beams generated by the first means; ii) a second electrode including first, second, and third pixel electrodes related to the first, second, and third primary colors respectively; iii) a light modulation layer extending between the first electrode and the second electrode; iv) a hologram diffracting the light beam emitted from the light source and thereby separating the light beam emitted from the light source into first, second, and third light beams having first, second, and third primary colors respectively, the hologram focusing the first, second, and third light beams on the first, second, and third pixel electrodes respectively; and v) second means located between the hologram and the second electrode for deflecting the first, second, and third light beams outputted from the hologram in substantially normal directions with respect to the first, second, and third pixel electrodes respectively.

A fifteenth aspect of this invention is based on the fourteenth aspect thereof, and provides a color display apparatus wherein the second means comprises a hologram.

A sixteenth aspect of this invention is based on the fourteenth aspect thereof, and provides a color display apparatus wherein the second means comprises a micro lens.

A seventeenth aspect of this invention is based on the fourteenth aspect thereof, and provides a color display apparatus wherein the second means comprises a micro prism.

An eighteenth aspect of this invention is based on the fourteenth aspect thereof, and provides a color display apparatus further comprising dichroic mirrors located between the light source and the spatial light modulation device and relating the first, second, and third primary colors respectively.

A nineteenth aspect of this invention provides a color filter comprising first, second, and third color pixels for modulating light beams having first, second, and third primary colors respectively; a first hologram diffracting an incident light beam into a first diffraction-resultant light beam; and a second hologram diffracting the first diffraction-resultant light beam into a second diffraction-resultant light beam including first, second, and third sub light beams which have the first, second, and third primary colors respectively, the second hologram directing the first, second, and third sub light beams toward the first, second, and third color pixels respectively.

A twentieth aspect of this invention provides a color display apparatus comprising a spatial light modulation device exposed to an incident light beam, and modulating the incident light beam into a modulation-resultant light beam; and first means for projecting the modulation-resultant light beam into a color image; wherein the spatial light modulation device comprises i) first, second, and third color pixels for modulating light beams having first, second, and third primary colors respectively; ii) a first hologram diffracting the incident light beam into a first diffraction-resultant light beam; and iii) a second hologram diffracting the first diffraction-resultant light beam into a second diffraction-resultant light beam including first, second, and third sub light beams which have the first, second, and third primary colors respectively, the second hologram directing the first, second, and third sub light beams toward the first, second, and third color pixels respectively.

DESCRIPTION OF THE PREFERRED EMBODIMENTS

First Embodiment

Figure 1:
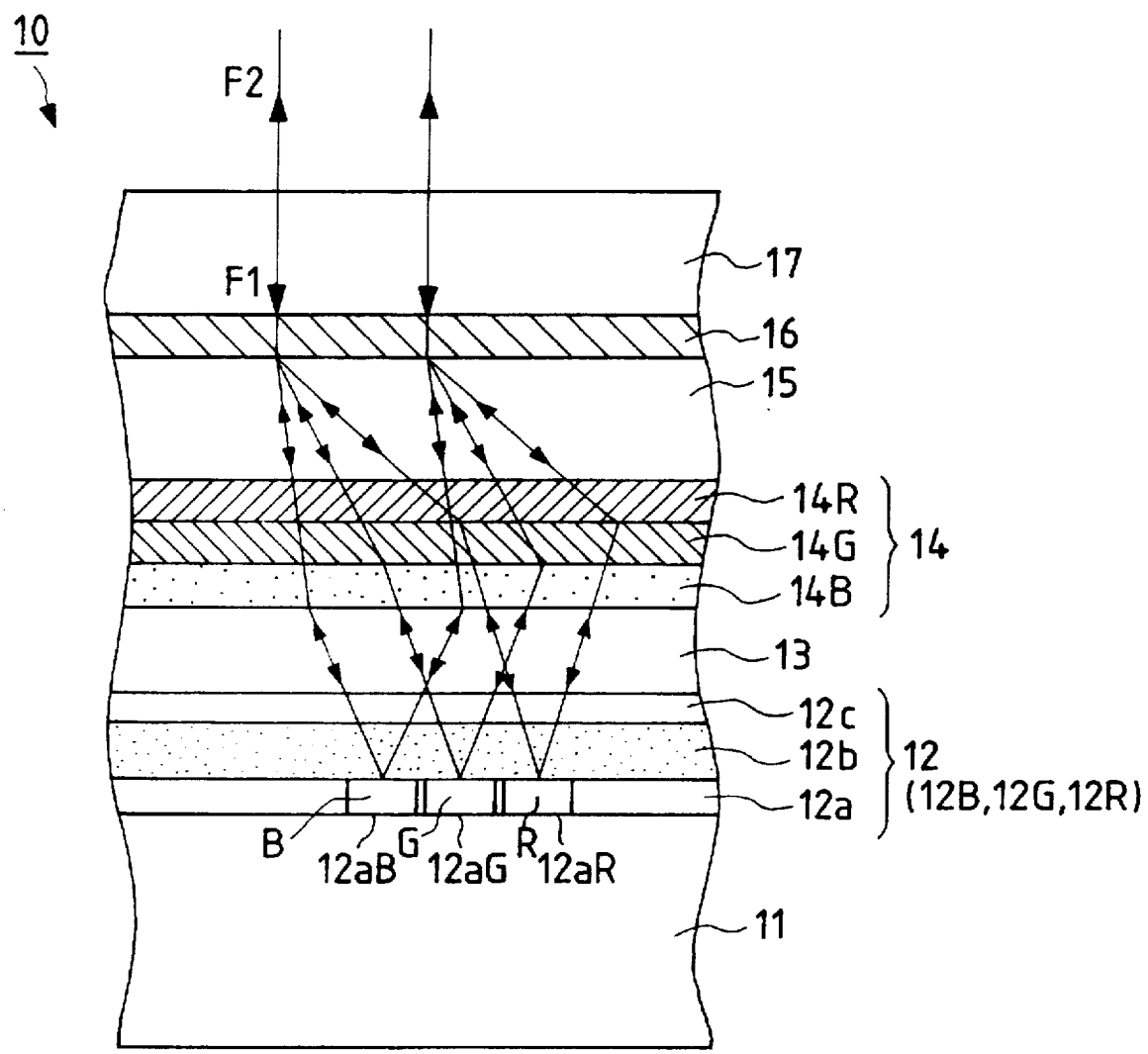
FIG. 1 is is a sectional view of a spatial light modulation device according to a fist embodiment of this invention.

With reference to FIG. 1, a spatial light modulation device (a spatial light modulation element) 10 including a color filter has a glass substrate 11 on which a pixel electrode layer 12a, a liquid crystal layer 12b, and a transparent electrode layer 12c are sequentially formed in a laminated structure. Thus, the liquid crystal layer 12b extends between the pixel electrode layer 12a and the transparent electrode layer 12c. The transparent electrode layer 12c is made of, for example, ITO (indium tin oxide). The liquid crystal layer 12b is driven by a signal voltage applied between the pixel electrode layer 12a and the transparent electrode layer 12c.

The pixel electrode layer 12a includes an array of independent and separate red pixel electrodes 12aR, green pixel electrodes 12aG, and blue pixel electrodes 12aB. The red pixel electrodes 12aR correspond to red pixels 12R respectively. The green pixel electrodes 12aG correspond to green pixels 12G respectively. The blue pixel electrodes 12aB correspond to blue pixels 12B respectively. Each red pixel 12R is composed of a red pixel electrode 12aR, a region of the liquid crystal layer 12b directly above the red pixel electrode 12aR, and a region of the transparent electrode layer 12c directly above the red pixel electrode 12aR. Each green pixel 12G is composed of a green pixel electrode 12aG, a region of the liquid crystal layer 12b directly above the green pixel electrode 12aG, and a region of the transparent electrode layer 12c directly above the green pixel electrode 12aG. Each blue pixel 12B is composed of a blue pixel electrode 12aB, a region of the liquid crystal layer 12b directly above the blue pixel electrode 12aB, and a region of the transparent electrode layer 12c directly above the blue pixel electrode 12aB.

The spatial light modulation device 10 includes an array of unit pixels 12 each composed of one red pixel 12R, one green pixel 12G, and one blue pixel 12B. An example of the array of the unit pixels 12 is of the delta type in which a unit pixel 12 recurs along a row direction (a horizontal direction), and also recurs along a column direction (a vertical direction) at an equal phase. In the delta array, unit pixels 12 in every even-numbered row are positionally offset from unit pixels 12 in every odd-numbered row by a phase corresponding to a half of one unit pixel 12. Alternatively, the array of the unit pixels 12 may be of the stripe type.

The spatial light modulation device 10 is of a reflection type in which the reflection of light occurs at the pixel electrode layer 12a. A dielectric mirror layer may be provided between the liquid crystal layer 12b and the pixel electrode layer 12a to implement the reflection of light.

As shown in FIG. 1, a glass layer 13 is formed on the transparent electrode layer 12c. A hologram 14 is formed on the glass layer 13. The hologram 14 has a lens function (a focusing function) by which a red light beam, a green light beam, and a blue light beam are focused on a red pixel 12R, a green pixel 12G, and a blue pixel 12B respectively. The hologram 14 directs the red light beam, the green light beam, and the blue light beam so that they will meet the red pixel 12R, the green pixel 12G, and the blue pixel 12B at approximately right angles respectively.

The hologram 14 has a laminate or a superposition of sub holograms 14R, 14G, and 14B for red, green, and blue respectively. The red sub hologram 14R diffracts a red light beam, and focuses the red light beam on a red pixel 12R at approximately a right angle. The red sub hologram 14R operates on substantially only red light, and thus its diffraction efficiency depends on the wavelength of applied light. The green sub hologram 14G diffracts a green light beam, and focuses the green light beam on a green pixel 12G at approximately a right angle. The green sub hologram 14G operates on substantially only green light, and thus its diffraction efficiency depends on the wavelength of applied light. The blue sub hologram 14B diffracts a blue light beam, and focuses the blue light beam on a blue pixel 12B at approximately a right angle. The blue sub hologram 14B operates on substantially only blue light, and thus its diffraction efficiency depends on the wavelength of applied light.

As shown in FIG. 1, a glass layer 15 is formed on the hologram 14. Another hologram 16 is formed on the glass layer 15. The hologram 16 deflects and diffracts an incident light beam. The hologram 16 serves to change the direction of travel of the incident light beam. A glass layer 17 is formed on the hologram 16.

The spatial light modulation device 10 operates as follows. In a region approximately directly above one unit pixel 12, a forward light beam (an incident light beam) F1 is applied from above to the upper surface of the spatial light modulation device 10 along substantially a normal direction with respect thereto. The forward light beam F1 passes through the glass layer 17 before reaching the hologram 16. The forward light beam F1 is diffracted by the hologram 16 when passing therethrough. Different-wavelength components (different color components) of the forward light beam F1 are outputted from the hologram 16 at different angles respectively. Accordingly, the hologram 16 separates the forward light beam F1 into different-color forward light beams including a red light beam, a green light beam, and a blue light beam.

The forward red light beam, the forward green light beam, and the forward blue light beam outputted from the hologram 16 pass through the glass layer 15 before reaching the hologram 14. The forward red light beam is diffracted and is changed in travel direction when passing through the red sub hologram 14R. The forward red light beam passes through the green sub hologram 14G and the blue sub hologram 14B without being processed or changed thereby. The red sub hologram 14R has a lens function by which the forward red light beam is focused on a corresponding red pixel electrode 12aR. The forward green light beam is diffracted and is changed in travel direction when passing through the green sub hologram 14G. The forward green light beam passes through the red sub hologram 14R and the blue sub hologram 14B without being processed or changed thereby. The green sub hologram 14G has a lens function by which the forward green light beam is focused on a corresponding green pixel electrode 12aG. The forward blue light beam is diffracted and is changed in travel direction when passing through the blue sub hologram 14B. The forward blue light beam passes through the red sub hologram 14R and the green sub hologram 14G without being processed or changed thereby. The blue sub hologram 14B has a lens function by which the forward blue light beam is focused on a corresponding blue pixel electrode 12aB.

The forward red light beam, the forward green light beam, and the forward blue light beam outputted from the hologram 14 pass through the glass layer 13 before reaching a corresponding red pixel 12R, a corresponding green pixel 12G, and a corresponding blue pixel 12B respectively. The forward red light beam successively passes through the transparent electrode 12c and the liquid crystal layer 12b before reaching the corresponding red pixel electrode 12aR. The forward green light beam successively passes through the transparent electrode 12c and the liquid crystal layer 12b before reaching the corresponding green pixel electrode 12aG. The forward blue light beam successively passes through the transparent electrode 12c and the liquid crystal layer 12b before reaching the corresponding blue pixel electrode 12aB.

The travel direction change of the forward red light beam by the red sub hologram 14R substantially cancels the travel direction change of the forward red light beam by the hologram 16. Accordingly, the forward red light beam is incident to the corresponding red pixel 12R along approximately a normal direction with respect thereto. The travel direction change of the forward green light beam by the green sub hologram 14G substantially cancels the travel direction change of the forward green light beam by the hologram 16. Accordingly, the forward green light beam is incident to the corresponding green pixel 12G along approximately a normal direction with respect thereto. The travel direction change of the forward blue light beam by the blue sub hologram 14B substantially cancels the travel direction change of the forward blue light beam by the hologram 16. Accordingly, the forward blue light beam is incident to the corresponding blue pixel 12B along approximately a normal direction with respect thereto. The incidences of the forward red, green, and blue light beams to the red, green, and blue pixels 12R, 12G, and 12B along the normal directions provide a high efficiency of use of light.

The red light beam, the green light beam, and the blue light beam are reflected at the upper surfaces of the corresponding red pixel electrode 12aR, the corresponding green pixel electrode 12aG, and the corresponding blue pixel electrode 12aB respectively. Then, the red light beam, the green light beam, and the blue light beam return along the paths substantially same as those of the forward travel thereof respectively. During the return, the red light beam, the green light beam, and the blue light beam successively pass through the liquid crystal layer 12b, the transparent electrode 12c, the glass layer 13, the hologram 14, the glass layer 15, the hologram 16, and the glass layer 17. Then, the return red light beam, the return green light beam, and the return blue light beam leave the spatial light modulation device 10 as a composite return light beam (a composite reflected light beam) F2.

The red light beam is modulated by the liquid crystal layer 12b in response to a signal voltage applied between the corresponding red pixel electrode 12aR and the transparent electrode 12c. The green light beam is modulated by the liquid crystal layer 12b in response to a signal voltage applied between the corresponding green pixel electrode 12aG and the transparent electrode 12c. The blue light beam is modulated by the liquid crystal layer 12b in response to a signal voltage applied between the corresponding blue pixel electrode 12aB and the transparent electrode 12c. Accordingly, the return red light beam, the return green light beam, and the return blue light beam are modulation-resultant red, green, and blue light beams which form an indicated color image.

A first example of the hologram 16 has a diffraction efficiency which is independent of or is slightly dependent on the wavelength of applied light. A second example of the hologram 16 has a diffraction efficiency which depends on the wavelength of applied light. A third example of the hologram 16 has a laminate or a superposition of a first sub hologram diffracting only red light, a second sub hologram diffracting only green light, and a third sub hologram diffracting only blue light. A fourth example of the hologram 16 has a diffraction efficiency which is independent of or is slightly dependent on the wavelength of applied light. In addition, the fourth example of the hologram 16 provides a diffraction angle which is independent of or is slightly dependent on the wavelength of applied light.

In the case where the hologram 16 provides a diffraction angle depending on the wavelength of applied light, it is preferable to differentiate the diffraction angles provided by the hologram 14 for red light, green light, and blue light respectively.

In the case where the hologram 16 provides a diffraction angle independent of the wavelength of applied light, it is preferable to equalize the diffraction angles provided by the hologram 14 for red light, green light, and blue light respectively.

Each of the holograms 14 and 16 may include a plane hologram such as a Lippmann hologram. Alternatively, each of the holograms 14 and 16 may include a volume hologram such as a relief hologram, a phase hologram, or an amplitude hologram.

As previously described, the hologram 14 has a focusing function. A first example of the hologram 14 has a pattern of Fresnel zones. A second example of the hologram 14 has a pattern of concentric circles of interference fringes which are arranged at different pitches. A third example of the hologram 14 has a honeycomb pattern of interference fringes.

The hologram 16 may have a focusing function. In this case, the hologram 14 can be of the non-focusing type.

The glass layer 15 may be omitted. In this case, the hologram 16 is directly superposed on the hologram 14.

The presence of the hologram 16 enables increased angles of incidence of the red, green, and blue light beams to the hologram 14. Accordingly, the angle of incidence of an input light beam to the spatial light modulation device 10 can be small. Thus, in the case where the spatial light modulation device 10 is applied to a display apparatus, the image circle of a projection lens of the display apparatus is prevented from excessively increasing. This is advantageous in providing a high brightness, a high resolution, and a compact structure of the display apparatus.

The spatial light modulation device 10 can be used in various apparatuses such as a liquid crystal display of a transmission type or a reflection type, or a CCD camera. For example, the spatial light modulation device 10 is located at an input side of a photodetector array in a camera.

Second Embodiment

Figure 2:
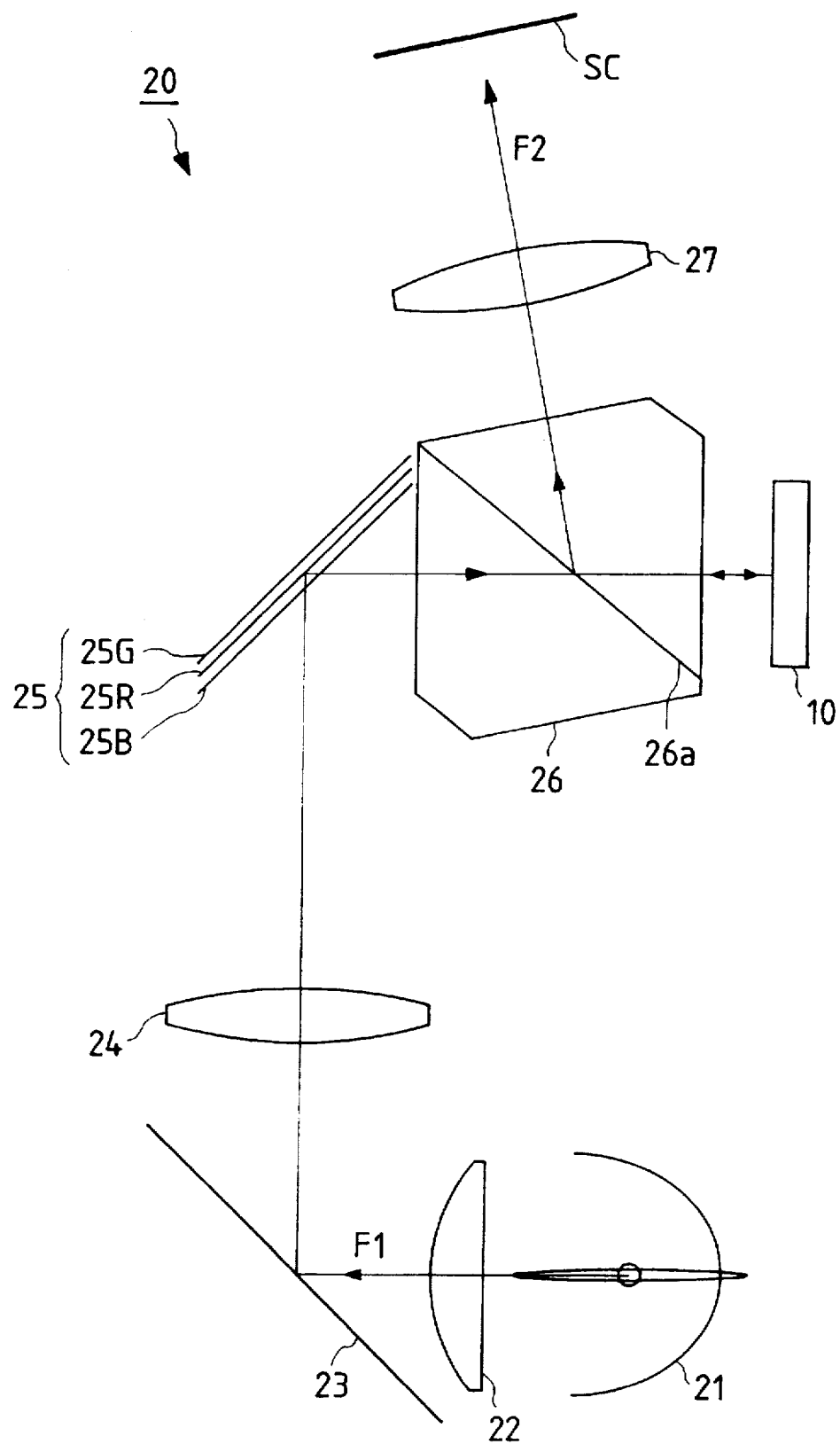
FIG. 2 is a diagram of a color display apparatus according to a second embodiment of this invention.

With reference to FIG. 2, a color display apparatus 20 includes a light source 21 emitting a forward beam F1 of white light toward a lens 22. The forward light beam F passes through the lens 22 before reaching a cold mirror 23 and being reflected thereby. The forward light beam F1 travels from the cold mirror 23 to a lens 24, and then passes through the lens 24. Infrared components are removed from the forward light beam F1 by the lens 22, the cold mirror 23, and the lens 24. The forward light beam F1 is made into a beam of approximately parallel rays by the lens 22, the cold mirror 23, and the lens 24.

The parallel-light beam travels from the lens 24 to a set 25 of dichroic mirrors 25B, 25R, and 25G. Blue components of the parallel-light beam are reflected by the dichroic mirror 25B while green and red components of the parallel-light beam pass therethrough. The green and red light components which have passed through the dichroic mirror 25B meet the dichroic mirror 25R. The red light components are reflected by the dichroic mirror 25R while the green light components pass therethrough. The green light components which have passed through the dichroic mirror 25R meet the dichroic mirror 25G. The green light components are reflected by the dichroic mirror 25G.

The reflecting surfaces of the dichroic mirrors 25B, 25R, and 25G are parallel to each other so that the blue light components, the red light components, and the green light components are reflected thereby at equal angles or toward parallel directions respectively. The reflected blue light beam, the reflected red light beam, and the reflected green light beam (the forward blue light beam, the forward red light beam, and the forward green light beam) travel from the dichroic mirror set 25 to an effective plane 26a within a polarization beam splitter 26. The dichroic mirror set 25 limits the wavelength band of light by selecting blue components, red components, and green components thereof.

According to one example of the dichroic mirror set 25, the dichroic mirrors 25B, 25R, and 25G are spaced at intervals very short relative to the diameter or the width of the parallel-light beam incident to the dichroic mirror set 25. In this case, the optical axes of the blue light beam, the red light beam, and the green light beam emitted from the dichroic mirror set 25 are approximately coincident with each other.

The p-polarized components of the forward blue light beam, the forward red light beam, and the forward green light beam pass through the effective plane 26a within the polarization beam splitter 26 before being incident to a spatial light modulation device 10. It is preferable that the p-polarized components of the forward blue light beam, the forward red light beam, and the forward green light beam are incident to the spatial light modulation device 10 at substantially right angles. The spatial light modulation device 10 is similar to that in the first embodiment.

In the spatial light modulation device 10, the forward red light beam, the forward green light beam, and the forward blue light beam are diffracted and changed in travel directions by holograms 14 and 16, and are then focused on a red pixel 12R, a green pixel 12G, and a blue pixel 12B at approximately right angles respectively. The red light beam, the green light beam, and the blue light beam are reflected at the red pixel 12R, the green pixel 12G, and the blue pixel 12B respectively. Then, the red light beam, the green light beam, and the blue light beam return along the paths substantially same as those of the forward travel thereof respectively. The red light beam, the green light beam, and the blue light beam are modulated by the red pixel 12R, the green pixel 12G, and the blue pixel 12B respectively.

The return red light beam, the return green light beam, and the return blue light beam travel from the spatial light modulation device 10 to the effective plane 26a within the polarization beam splitter 26. The angle of incidence of the return light beams to the effective plane 26a within the polarization beam splitter 26 is equal to the angle of incidence of the forward light beams thereto. The s-polarized components of the return red light beam, the return green light beam, and the return blue light beam are reflected by the effective plane 26a within the polarization beam splitter 26, and are then propagated to a projection lens 27. The return red light beam, the return green light beam, and the return blue light beam are combined by the projection lens 27 into a composite beam F2 of modulation-resultant red light, modulation-resultant green light, and modulation-resultant blue light, and are projected or focused by the projection lens 27 into a composite color image on a screen SC.

The hologram 14 tends to be inoperative to light components having a color intermediate between red and green, and light components having a color intermediate between green and blue. As previously described, the dichroic mirror set 25 limits the wavelength band of light by selecting blue components, red components, and green components thereof. Accordingly, light components having a color intermediate between red and green, and light components having a color intermediate between green and blue can be removed from the forward light beams incident to the hologram 14. This is advantageous in preventing or suppressing color turbidity, and in providing a high reproductivity of pure colors.

The return light beams (the reflected light beams) outputted by the spatial light modulation device 10 are prevented from diverging or spreading. Thus, the aperture of the projection lens 27 can be small. This is effective in providing a compact structure of the color display apparatus 20.

As previously described, the angle of incidence of the return light beams to the effective plane 26a within the polarization beam splitter 26 is equal to the angle of incidence of the forward light beams thereto. This is advantageous in providing a high contrast.

Third Embodiment

Figure 3:
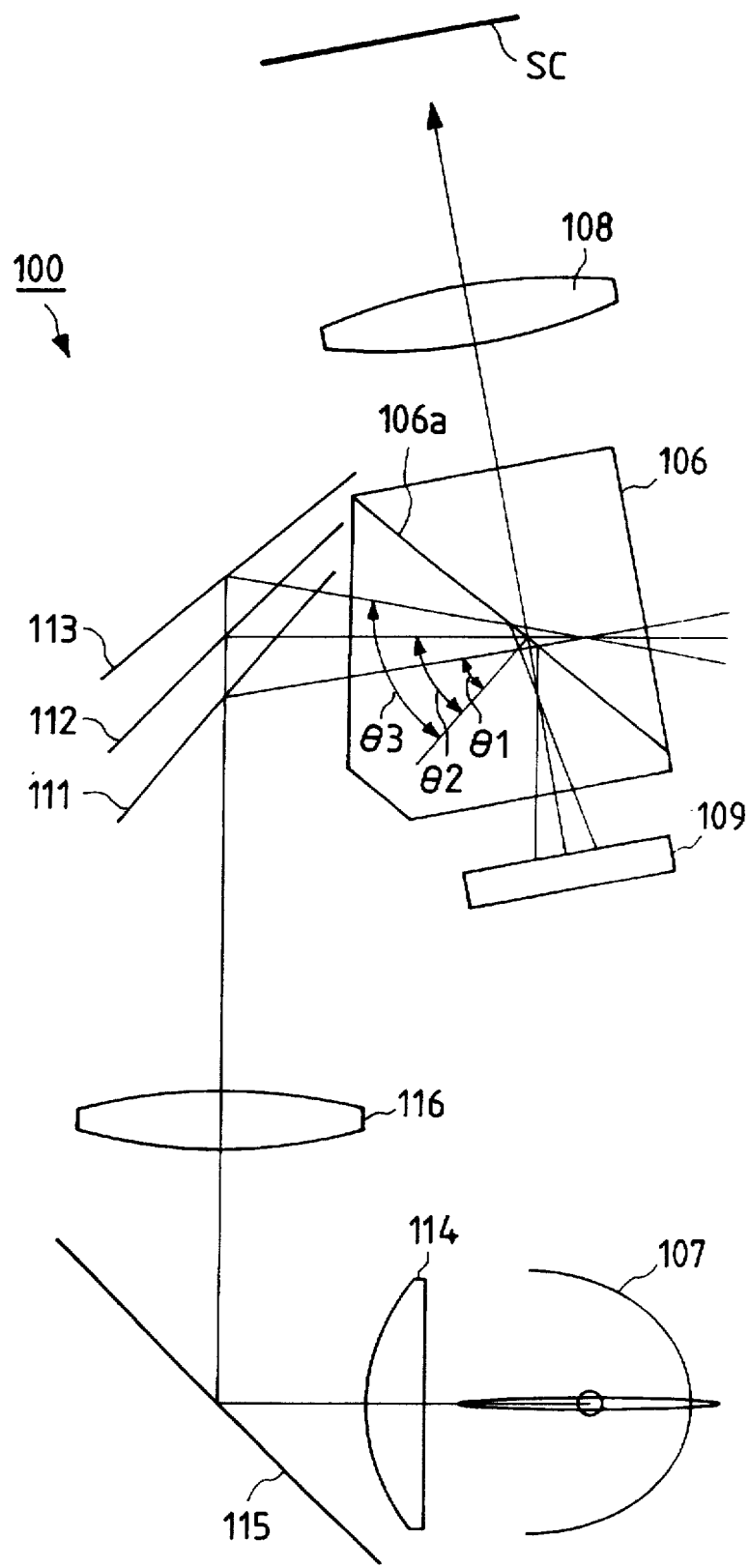
FIG. 3 is a diagram of a color display apparatus according to a third embodiment of this invention.

With reference to FIG. 3, a color display apparatus 100 includes a light source 107 emitting a forward beam of white light toward a lens 114. The forward light beam passes through the lens 114 before reaching a cold mirror 115 and being reflected thereby. The forward light beam travels from the cold mirror 115 to a lens 116, and then passes through the lens 116. Infrared components are removed from the forward light beam by the lens 114, the cold mirror 115, and the lens 116. The forward light beam is made into a beam of approximately parallel rays by the lens 114, the cold mirror 115, and the lens 116.

The parallel-light beam travels from the lens 116 to a set of dichroic mirrors 111, 112, and 113. Blue components of the parallel-light beam are reflected by the dichroic mirror 111 while green and red components of the parallel-light beam pass therethrough. The green and red light components which have passed through the dichroic mirror 111 meet the dichroic mirror 112. The red light components are reflected by the dichroic mirror 112 while the green light components pass therethrough. The green light components which have passed through the dichroic mirror 112 meet the dichroic mirror 113. The green light components are reflected by the dichroic mirror 113.

The reflecting surfaces of the dichroic mirrors 111, 112, and 113 are out of parallel with each other so that the reflected blue light components, the reflected red light components, and the reflected green light components are incident from the dichroic mirrors 111, 112, and 113 to an effective plane 106a within a polarization beam splitter 106 at different angles θ1, θ2, and θ3 respectively. The s-polarized components of the blue light beam, the s-polarized components of the red light beam, and the s-polarized components of the green light beam are reflected by the effective plane 106a within the polarization beam splitter 106 at the angles θ1, θ2, and θ3 respectively. The reflected blue light beam, the reflected red light beam, and the reflected green light beam are propagated from the effective plane 106a within the polarization beam splitter 106 to a spatial light modulation device 109.

The blue light beam, the red light beam, and the green light beam are reflected by the spatial light modulation device 109 while being modulated thereby. Then, the blue light beam, the red light beam, and the green light beam return along the paths substantially same as those of the forward travel thereof respectively. The return blue light beam, the return red light beam, and the return green light beam travel from the spatial light modulation device 109 to the effective plane 106a within the polarization beam splitter 106. The p-polarized components of the return blue light beam, the return red light beam, and the return green light beam are reflected by the effective plane 106a within the polarization beam splitter 106, and are then propagated to a projection lens 108. The return blue light beam, the return red light beam, and the return green light beam are combined by the projection lens 108 into a composite beam of modulation-resultant blue light, modulation-resultant red light, and modulation-resultant green light, and are focused by the projection lens 108 into a composite color image on a screen SC.

Figure 4:
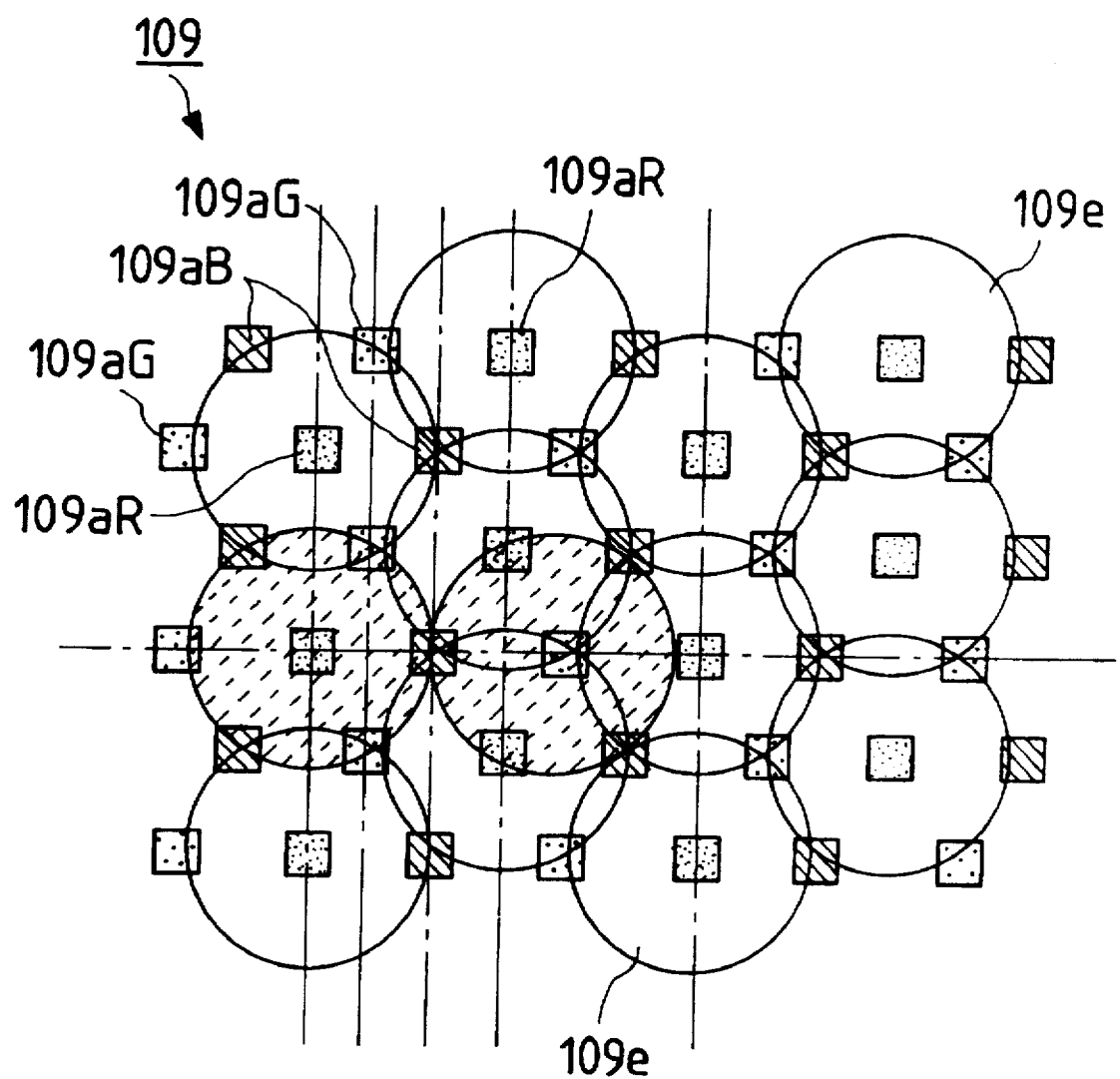
FIG. 4 is a diagram of micro lenses and pixel electrodes in a spatial light modulation device in FIG. 3.
Figure 5:
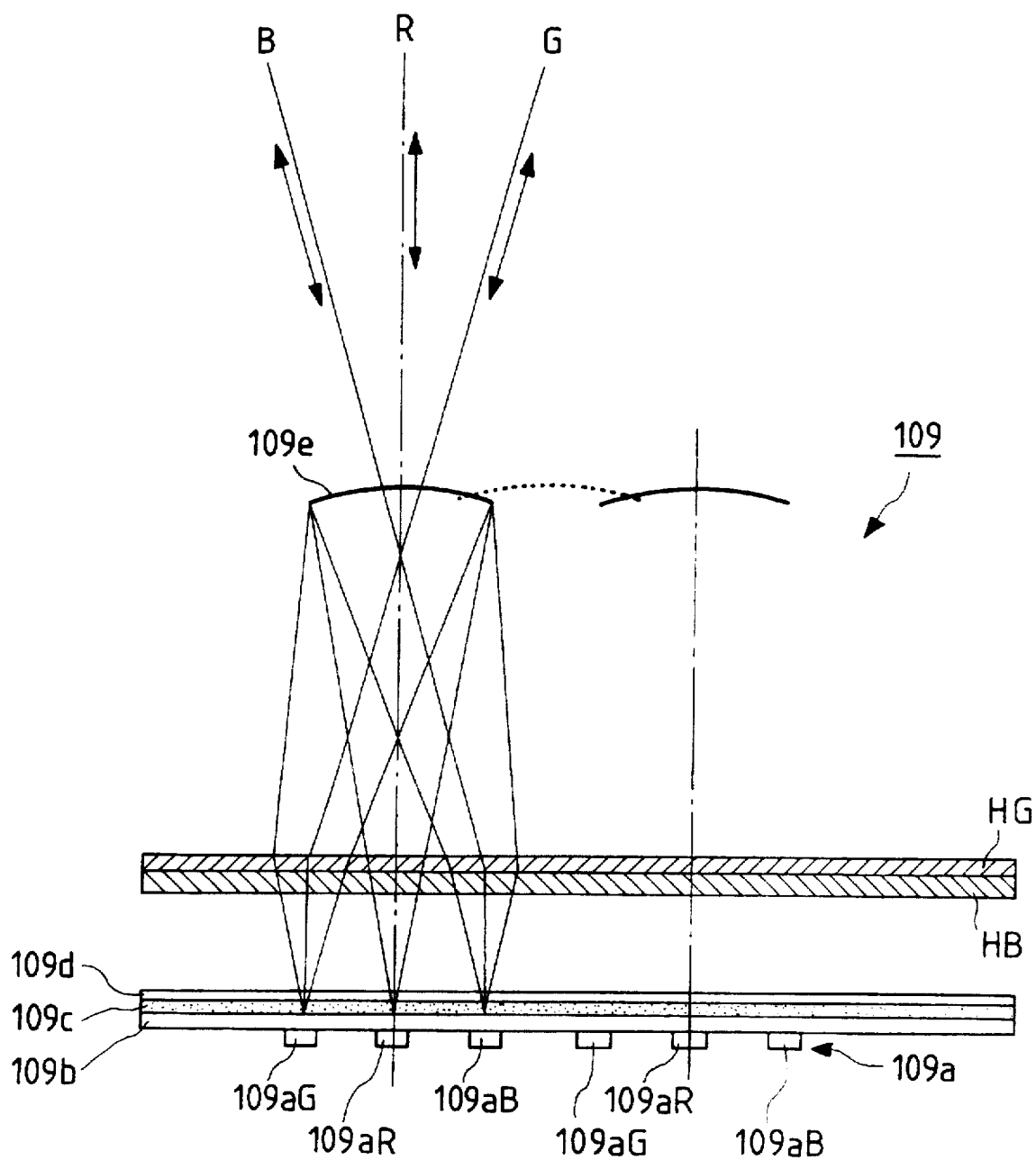
FIG. 5 is a sectional view of the spatial light modulation device in FIG. 3.

With reference to FIGS. 4 and 5, the spatial light modulation device 109 includes an array 109a of independent and separate red pixel electrodes 109aR, green pixel electrodes 109aG, and blue pixel electrodes 109aB. A laminate or a superposition of a transparent electrode layer 109d, a liquid crystal layer 109c, and a dielectric mirror layer 109b extends on the pixel electrode array 109a. The transparent electrode layer 109d is made of, for example, ITO (indium tin oxide). A region of the liquid crystal layer 109c directly above each of the pixel electrodes 109aR, 109aG, and 109aB is driven by a signal voltage applied between the pixel electrode and the transparent electrode layer 109d.

There is a recurring and periodical arrangement of unit pixels each having one red pixel electrode 109aR, one green pixel electrode 109aG, and one blue pixel electrode 109aB. As shown in FIG. 4, a red pixel electrode 109aR, a green pixel electrode 109aG, and a blue pixel electrode 109aB recur in every horizontal line. The phase of the recurrence of the pixel electrodes 109aR, 109aG, and 109aB in an odd-numbered horizontal line differs from that in an even-numbered horizontal line by a value corresponding to a half of one unit pixel.

An uppermost part of the spatial light modulation device 109 has an approximately honeycomb array of micro lenses 109e whose centers vertically align with the red pixel electrodes 109aR respectively. As shown in FIG. 5, the spatial light modulation device 109 includes a laminate or a superposition of hologram layers HG and HB which extends between the transparent electrode layer 109d and the array of the micro lenses 109e. The hologram layers HG and HB have diffraction efficiencies depending on the wavelength of applied light. The hologram layer HG diffracts and deflects only green light so that the axis of a green light beam outputted therefrom extends along a normal direction with respect to the liquid crystal layer 109c. Red light and blue light pass through the hologram layer HG without being diffracted thereby. The hologram layer HB diffracts and deflects only blue light so that the axis of a blue light beam outputted therefrom extends along a normal direction with respect to the liquid crystal layer 109c. Red light and green light pass through the hologram layer HB without being diffracted thereby.

The forward blue light beam "B", the forward red light beam "R", and the forward green light beam "G" are incident from the polarization beam splitter 106 to a micro lens 109e in the spatial light modulation device 109 at the different angles θ1, θ2, and θ3 respectively. The forward blue light beam "B", the forward red light beam "R", and the forward green light beam "G" pass through the micro lens 109e while being condensed or focused thereby. The resultant blue light beam "B", the resultant red light beam "R", and the resultant green light beam "G" travel from the micro lens 109e to the hologram layer HG. Then, the forward blue light beam "B", the forward red light beam "R", and the forward green light beam "G" successively pass through the hologram layers HG and HB. The forward green light beam "G" is diffracted and deflected by the hologram layer HG, being incident to a region of the liquid crystal layer 109c, directly above a green pixel electrode 109aG, at substantially a right angle. The forward blue light beam "B" is diffracted and deflected by the hologram layer HB, being incident to a region of the liquid crystal layer 109c, directly above a blue pixel electrode 109aB, at substantially a right angle. The forward red light beam "R" is diffracted and deflected by none of the hologram layers HG and HB, being incident to a region of the liquid crystal layer 109c, directly above a red pixel electrode 109aR, at substantially a right angle. The forward green light beam "G", the forward blue light beam "B", and the forward red light beam "R" travel through the liquid crystal layer 109c before being reflected by the dielectric mirror layer 109b. Then, the green light beam "G", the blue light beam "B", and the red light beam "R" return along the paths substantially the same as those of the forward travel thereof. The return green light beam "G", the return blue light beam "B", and the return red light beam "R" leave the spatial light modulation device 109.

When the green light beam "G" travels in the liquid crystal layer 109c, the green light beam "G" is modulated in response to a signal voltage applied between the green pixel electrode 109aG and the transparent electrode layer 109d. When the blue light beam "B" travels in the liquid crystal layer 109c, the blue light beam "B" is modulated in response to a signal voltage applied between the blue pixel electrode 109aB and the transparent electrode layer 109d. When the red light beam "R" travels in the liquid crystal layer 109c, the red light beam "R" is modulated in response to a signal voltage applied between the red pixel electrode 109aR and the transparent electrode layer 109d.

It should be noted that the dielectric mirror layer 109b may be omitted. In this case, the red pixel electrodes 109aR, the green pixel electrodes 109aG, and the blue pixel electrodes 109aB are designed to reflect red light, green light, and blue light respectively.

The spatial light modulation device 109 may be modified into a transmission type. In this case, the red pixel electrodes 109aR, the green pixel electrodes 109aG, and the blue pixel electrodes 109aB are designed to transmit red light, green light, and blue light respectively.

Fourth Embodiment

Figure 6:
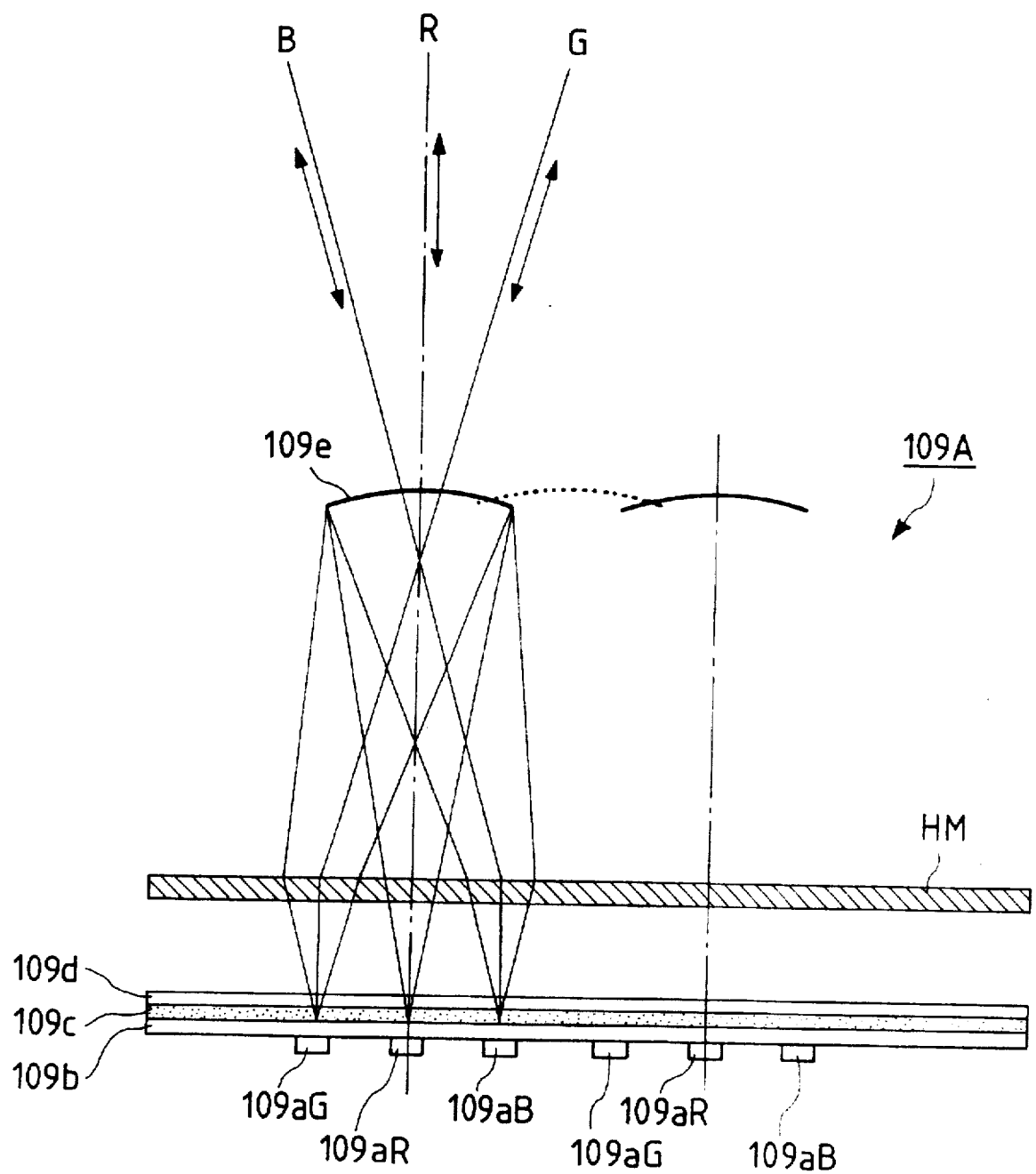
FIG. 6 is a sectional view of a spatial light modulation device in a color display apparatus according to a fourth embodiment of this invention.

A fourth embodiment of this invention is similar to the third embodiment thereof except for design changes indicated later. The fourth embodiment uses a spatial light modulation device 109A of FIG. 6 instead of the spatial light modulation device 109 of FIG. 5. As shown in FIG. 6, the spatial light modulation device 109A includes a multiplex hologram HM having only a single layer which replaces the hologram layers HG and HB (see FIG. 5).

During the fabrication of the multiplex hologram HM, a common photosensitive layer is exposed to two different light beams. The multiplex hologram HM serves as the hologram layer HG and also the hologram layer HB.

Fifth Embodiment

Figure 7:
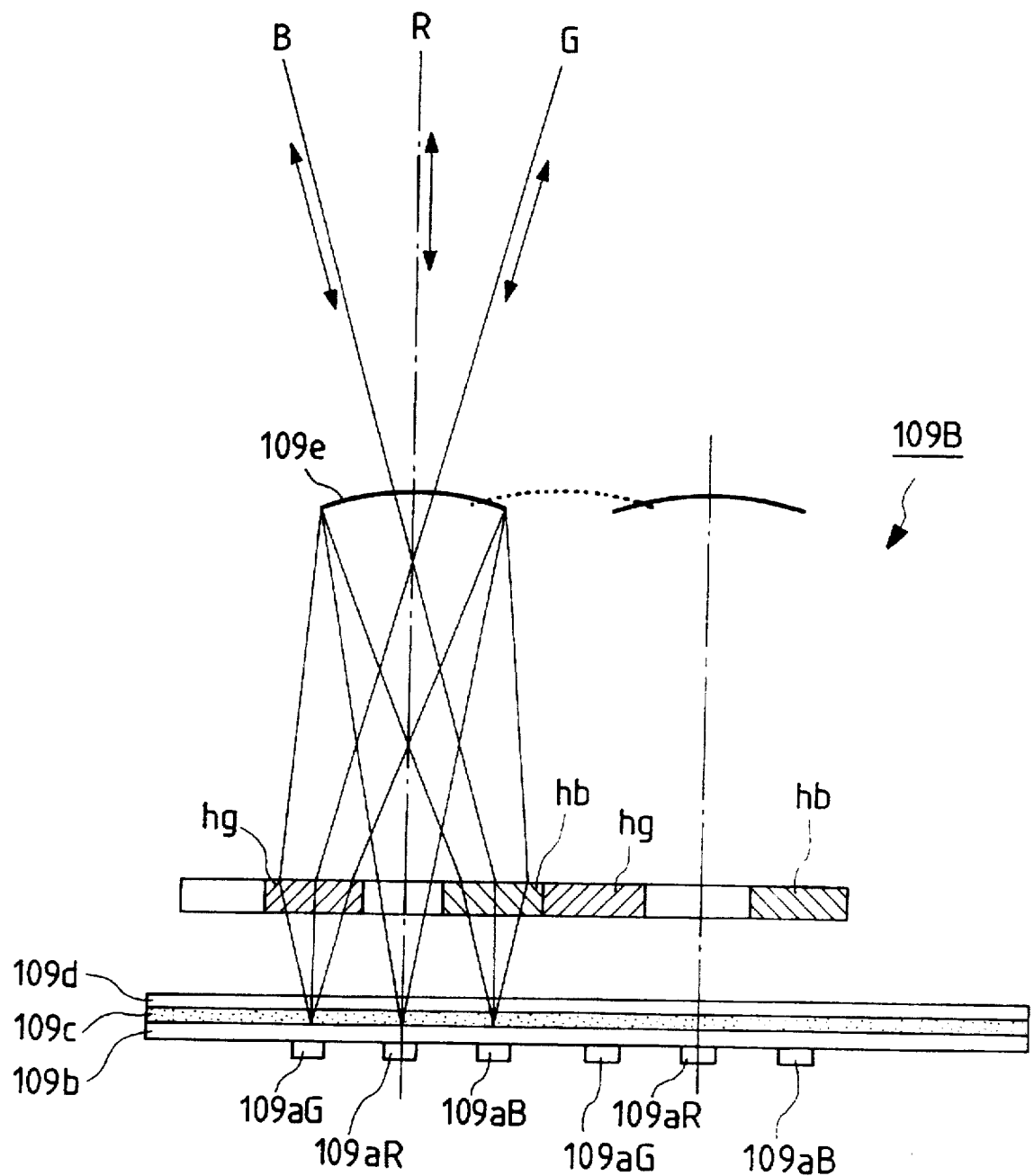
FIG. 7 is a sectional view of a spatial light modulation device in a color display apparatus according to a fifth embodiment of this invention.

A fifth embodiment of this invention is similar to the third embodiment thereof except for design changes indicated later. The fifth embodiment uses a spatial light modulation device 109B of FIG. 7 instead of the spatial light modulation device 109 of FIG. 5. As shown in FIG. 7, the spatial light modulation device 109B includes an array of small holograms "hg" and "hb" extending along a common plane. The array of the small holograms "hg" and "hb" replaces the hologram layers HG and HB (see FIG. 5).

The small holograms "hg" are designed to diffract green light. The small holograms "hb" are designed to diffract blue light. The small holograms "hg" vertically align with green pixel electrodes 109aG respectively. The small holograms "hb" vertically align with blue pixel electrodes 109aB respectively. The small-hologram array has ineffective regions which vertically align with red pixel electrodes 109aR respectively.

A forward green light beam "G" is diffracted and deflected by a small hologram "hg", being incident to a region of a liquid crystal layer 109c, directly above a green pixel electrode 109aG, at substantially a right angle. A forward blue light beam "B" is diffracted and deflected by a small hologram "hb", being incident to a region of the liquid crystal layer 109c, directly above a blue pixel electrode 109aB, at substantially a right angle. A forward red light beam "R" passes through an ineffective region of the small-hologram array, being incident to a region of the liquid crystal layer 109c, directly above a red pixel electrode 109aR, at substantially a right angle.

It should be noted that the small holograms "hb" and "hg" may have diffraction efficiencies independent of the wavelength of applied light.

Sixth Embodiment

Figure 8:
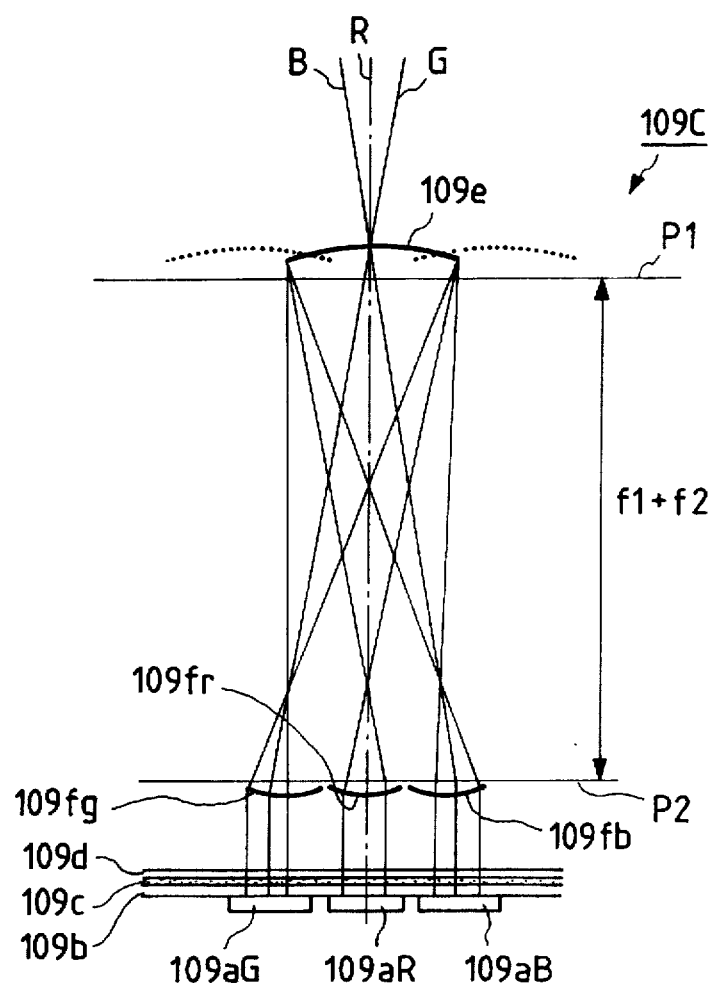
FIG. 8 is a sectional view of a spatial light modulation device in a color display apparatus according to a sixth embodiment of this invention.
Figure 9:
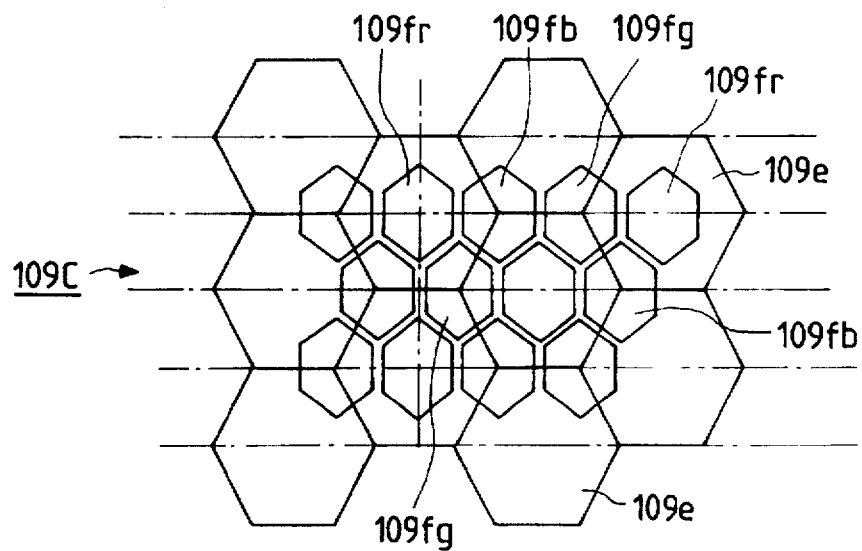
FIG. 9 is a diagram of micro lenses in the spatial light modulation device in FIG. 8.

A sixth embodiment of this invention is similar to the third embodiment thereof except for design changes indicated later. The sixth embodiment uses a spatial light modulation device 109C of FIGS. 8 and 9 instead of the spatial light modulation device 109 of FIG. 5. As shown in FIGS. 8 and 9, the spatial light modulation device 109C includes a honeycomb array of micro lenses 109fr, 109fg, and 109fb extending along a common plane. The array of the micro lenses 109fr, 109fg, and 109fb replaces the hologram layers HG and HB (see FIG. 5). The array of the micro lenses 109fr, 109fg, and 109fb extends between a transparent electrode layer 109d and an array of micro lenses 109e. There are three micro lenses 109fr, 109fg, and 109fb per micro lens 109e.

The micro lenses 109fr vertically align with red pixel electrodes 109aR respectively. The micro lenses 109fg vertically align with green pixel electrodes 109aG respectively. The micro lenses 109fb vertically align with blue pixel electrodes 109aB respectively. The distance between a principal plane P1 of a micro lens 109e and a principal plane of micro lenses 109fr, 109fg, and 109fb is set equal to "f1+f2" where "f1" denotes the focal length of the micro lens 109e and "f2" denotes the focal length of the micro lenses 109fr, 109fg, and 109fb.

A forward red light beam "R" of approximately parallel rays passes through a micro lens 109e before being focused thereby into a spot on the focal plane of the micro lens 109e. Then, the forward red light beam "R" diverges and reaches a micro lens 109fr. The forward red light beam "R" passes through the micro lens 109fr, being made thereby into a beam of approximately parallel rays and being incident to a region of the liquid crystal layer 109c, directly above a red pixel electrode 109aR, at substantially a right angle. A forward green light beam "G" of approximately parallel rays passes through the micro lens 109e before being focused thereby into a spot on the focal plane of the micro lens 109e. Then, the forward green light beam "G" diverges and reaches a micro lens 109fg. The forward green light beam "G" passes through the micro lens 109fg, being made thereby into a beam of approximately parallel rays and being incident to a region of the liquid crystal layer 109c, directly above a green pixel electrode 109aG, at substantially a right angle. A forward blue light beam "B" of approximately parallel rays passes through the micro lens 109e before being focused thereby into a spot on the focal plane of the micro lens 109e. Then, the forward blue light beam "B" diverges and reaches a micro lens 109fb. The forward green light beam "B" passes through the micro lens 109fb, being made thereby into a beam of approximately parallel rays and being incident to a region of the liquid crystal layer 109c, directly above a blue pixel electrode 109aB, at substantially a right angle.

Seventh Embodiment

Figure 10:
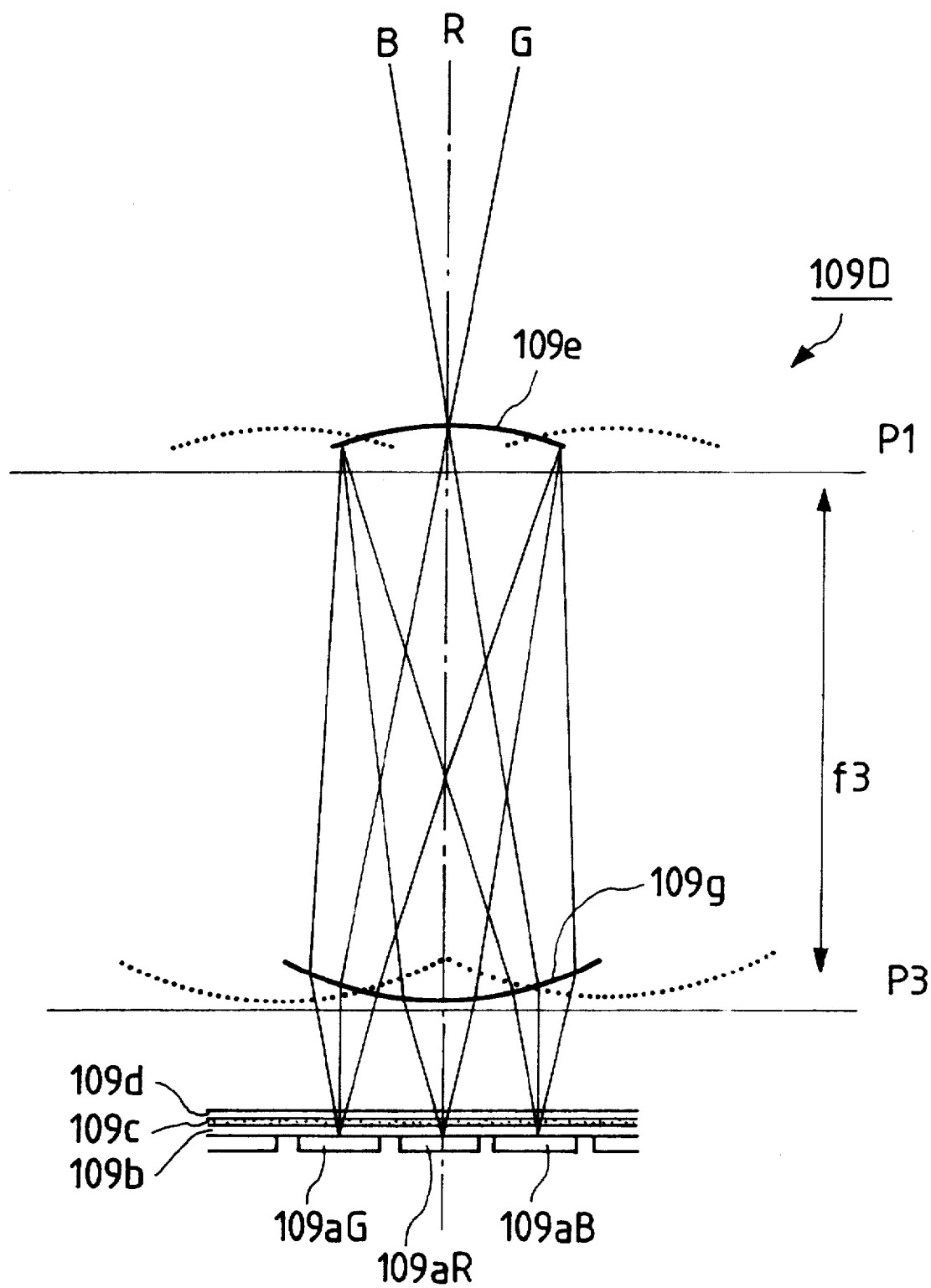
FIG. 10 is a sectional view of a spatial light modulation device in a color display apparatus according to a seventh embodiment of this invention.

A seventh embodiment of this invention is similar to the third embodiment thereof except for design changes indicated later. The seventh embodiment uses a spatial light modulation device 109D of FIG. 10 instead of the spatial light modulation device 109 of FIG. 5. As shown in FIG. 10, the spatial light modulation device 109D includes an approximately honeycomb array of micro lenses 109g whose centers vertically align with red pixel electrodes 109aR respectively. The array of the micro lenses 109g replaces the hologram layers HG and HB (see FIG. 5). The array of the micro lenses 109g extends between a transparent electrode layer 109d and an array of micro lenses 109e. There is one micro lens 109g per micro lens 109e.

The distance between a principal plane P1 of a micro lens 109e and a principal plane of a micro lens 109g is set equal to the focal length "f3" of the micro lens 109g. Accordingly, the micro lens 9g is telecentric.

A forward green light beam "G" successively passes through a micro lens 109e and a micro lens 109g, being focused thereby on a region of a liquid crystal layer 109c, directly above a green pixel electrode 109aG, at substantially a right angle. A forward blue light beam "B" successively passes through the micro lens 109e and the micro lens 109g, being focused thereby on a region of the liquid crystal layer 109c, directly above a blue pixel electrode 109aB, at substantially a right angle. A forward red light beam "R" successively passes through the micro lens 109e and the micro lens 109g, being focused thereby on a region of the liquid crystal layer 109c, directly above a red pixel electrode 109aR, at substantially a right angle.

Eighth Embodiment

Figure 11:
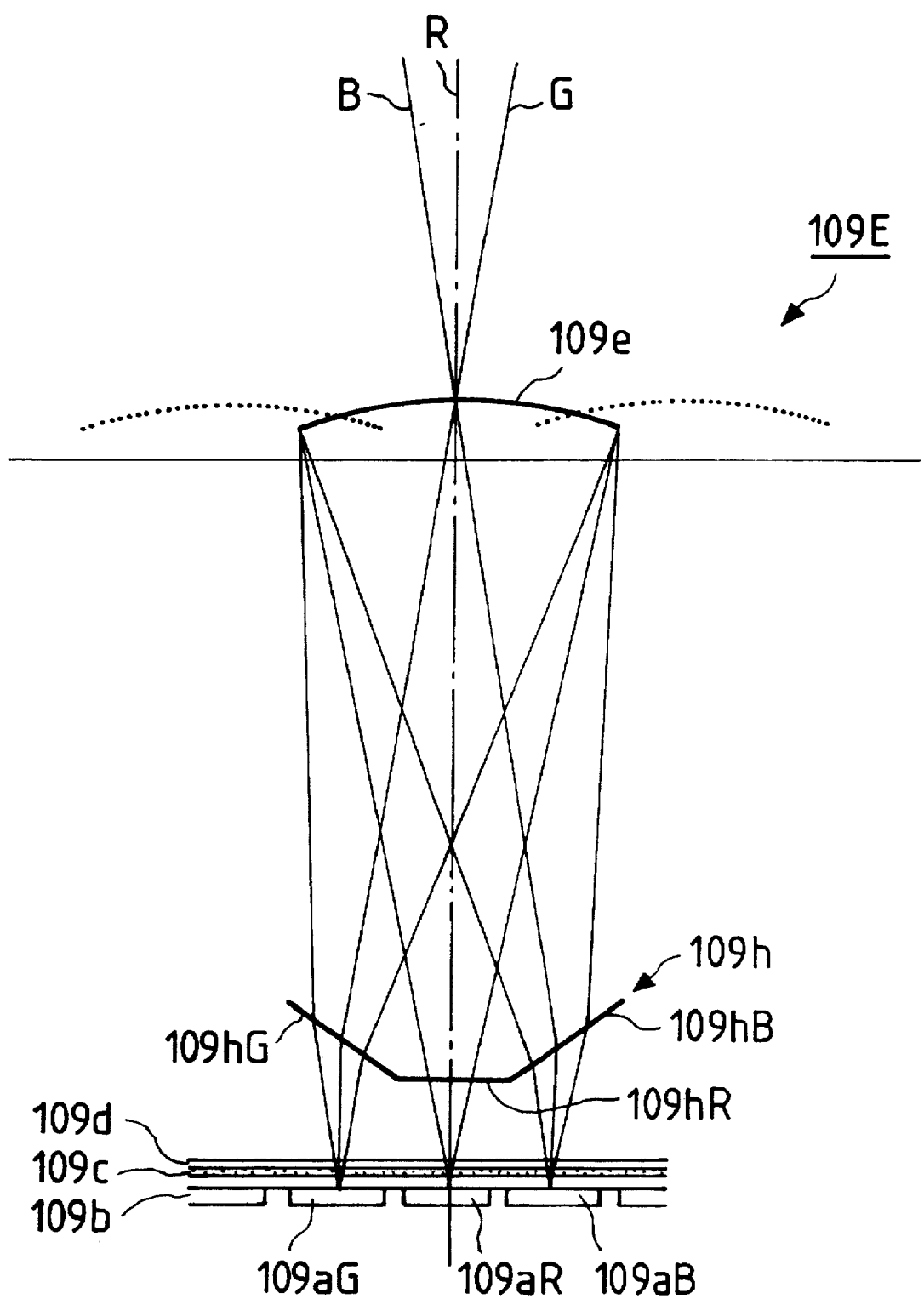
FIG. 11 is a sectional view of a spatial light modulation device in a color display apparatus according to an eighth embodiment of this invention.

An eighth embodiment of this invention is similar to the third embodiment thereof except for design changes indicated later. The eighth embodiment uses a spatial light modulation device 109E of FIG. 11 instead of the spatial light modulation device 109 of FIG. 5. As shown in FIG. 11, the spatial light modulation device 109E includes an approximately honeycomb array of micro prisms 109h whose centers vertically align with red pixel electrodes 109aR respectively. The array of the micro prisms 109h replaces the hologram layers HG and HB (see FIG. 5). The array of the micro prisms 109h extends between a transparent electrode layer 109d and an array of micro lenses 109e. There is one micro prism 109h per micro lens 109e.

Each micro prism 109h has a plane 109hR parallel to a liquid crystal layer 109c, and planes 109hB and 109hG inclined to the liquid crystal layer 109c. The planes 109hR of the micro prisms 109h vertically align with red pixel electrodes 109aR respectively. The planes 109hB of the micro prisms 109h vertically align with blue pixel electrodes 109aB respectively. The planes 109hG of the micro prisms 109h vertically align with green pixel electrodes 109aG respectively.

A forward green light beam "G" travels from a micro lens 109e to the plane 109hG of a micro prism 109h. The forward green light beam "G" is refracted and deflected by the plane 109hG of the micro prism 109h, being incident to a region of the liquid crystal layer 109c, directly above a green pixel electrode 109aG, at substantially a right angle. A forward blue light beam "B" travels from the micro lens 109e to the plane 109hB of the micro prism 109h. The forward blue light beam "B" is refracted and deflected by the plane 109hB of the micro prism 109h, being incident to a region of the liquid crystal layer 109c, directly above a blue pixel electrode 109aB, at substantially a right angle. A forward red light beam "R" travels from the micro lens 109e to the plane 109hR of the micro prism 109h. The forward red light beam "R" is neither refracted nor deflected by the plane 109hR of the micro prism 109h, being incident to a region of the liquid crystal layer 109c, directly above a red pixel electrode 109aR, at substantially a right angle.

Ninth Embodiment

A ninth embodiment of this invention is similar to the third embodiment thereof except for design changes indicated later. The ninth embodiment uses a total reflection mirror (not shown) in place of the dichroic mirrors 111, 112, and 113 (see FIG. 3). Further, the ninth embodiment uses a spatial light modulation device 109F of FIG. 12 instead of the spatial light modulation device 109 of FIG. 5.

Figure 12:
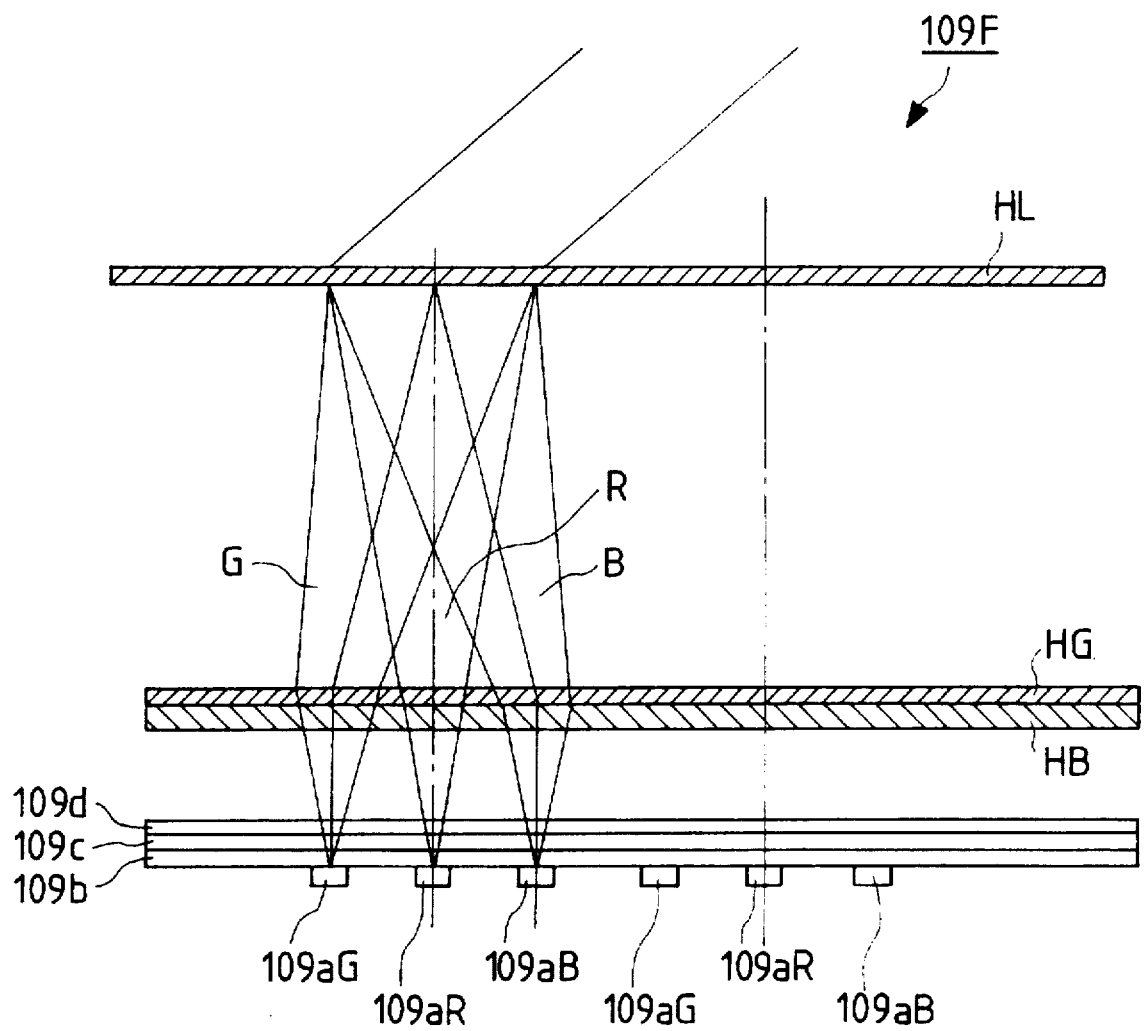
FIG. 12 is a sectional view of a spatial light modulation device in a color display apparatus according to a ninth embodiment of this invention.

As shown in FIG. 12, the spatial light modulation device 109F includes a hologram lens HL which replaces the array of the micro lenses 109e (see FIG. 5). The hologram lens HL has an array of unit holograms each corresponding to one blue pixel electrode 109aB, one red pixel electrode 109aR, and one green pixel electrode 109aG.

A forward white light beam is incident to the hologram lens HL, being diffracted thereby and being separated into a forward red light beam "R", a forward green light beam "G", and a forward blue light beam "B". The forward red light beam "R", the forward green light beam "G", and the forward blue light beam "B" are outputted from the hologram lens HL at different angles respectively.

The hologram lens HL has the function of focusing the forward red light beam "R", the forward green light beam "G", and the forward blue light beam "B" on a red pixel electrode 109aR, a green pixel electrode 109aG, and a blue pixel electrode 109aB respectively. The hologram lens HL has a diffraction efficiency independent of the wavelength of applied light. The diffraction efficiency of the hologram lens HL may be slightly dependent on the wavelength of applied light. The hologram lens HL provides different diffraction angles of the forward red light beam "R", the forward green light beam "G", and the forward blue light beam "B" respectively.

The forward blue light beam "B", the forward red light beam "R", and the forward green light beam "G" travel from the hologram lens HL to a hologram layer HG. Then, the forward blue light beam "B", the forward red light beam "R", and the forward green light beam "h" successively pass through the hologram layer HG and a hologram lens HB. The forward green light beam "G" is diffracted and deflected by the hologram layer HG, being incident to a region of a liquid crystal layer 109c, directly above a green pixel electrode 109aG, at substantially a right angle. The forward blue light beam "B" is diffracted and deflected by the hologram layer HB, being incident to a region of the liquid crystal layer 109c, directly above a blue pixel electrode 109aB, at substantially a right angle. The forward red light beam "R" is diffracted and deflected by none of the hologram layers HG and HB, being incident to a region of the liquid crystal layer 109c, directly above a red pixel electrode 109aR, at substantially a right angle. The forward green light beam "G", the forward blue light beam "B", and the forward red light beam "R" travel through the liquid crystal layer 109c before being reflected by a dielectric mirror layer 109b. Then, the green light beam "G", the blue light beam "B", and the red light beam "R" return along the paths substantially the same as those of the forward travel thereof. The return green light beam "G", the return blue light beam "B", and the return red light beam "R" leave the spatial light modulation device 109F.

The total reflection mirror may be replaced by dichroic mirrors close to and parallel with each other. In this case, the dichroic mirrors limit the wavelength band of a forward white light beam incident to the spatial light modulation device 109F.

The hologram layers HG and HB may be replaced by a multiplex hologram, small holograms, micro lenses, and micro prisms similar to those in the third, fourth, fifth, sixth, seventh, and eighth embodiments.

Tenth Embodiment

Figure 13:
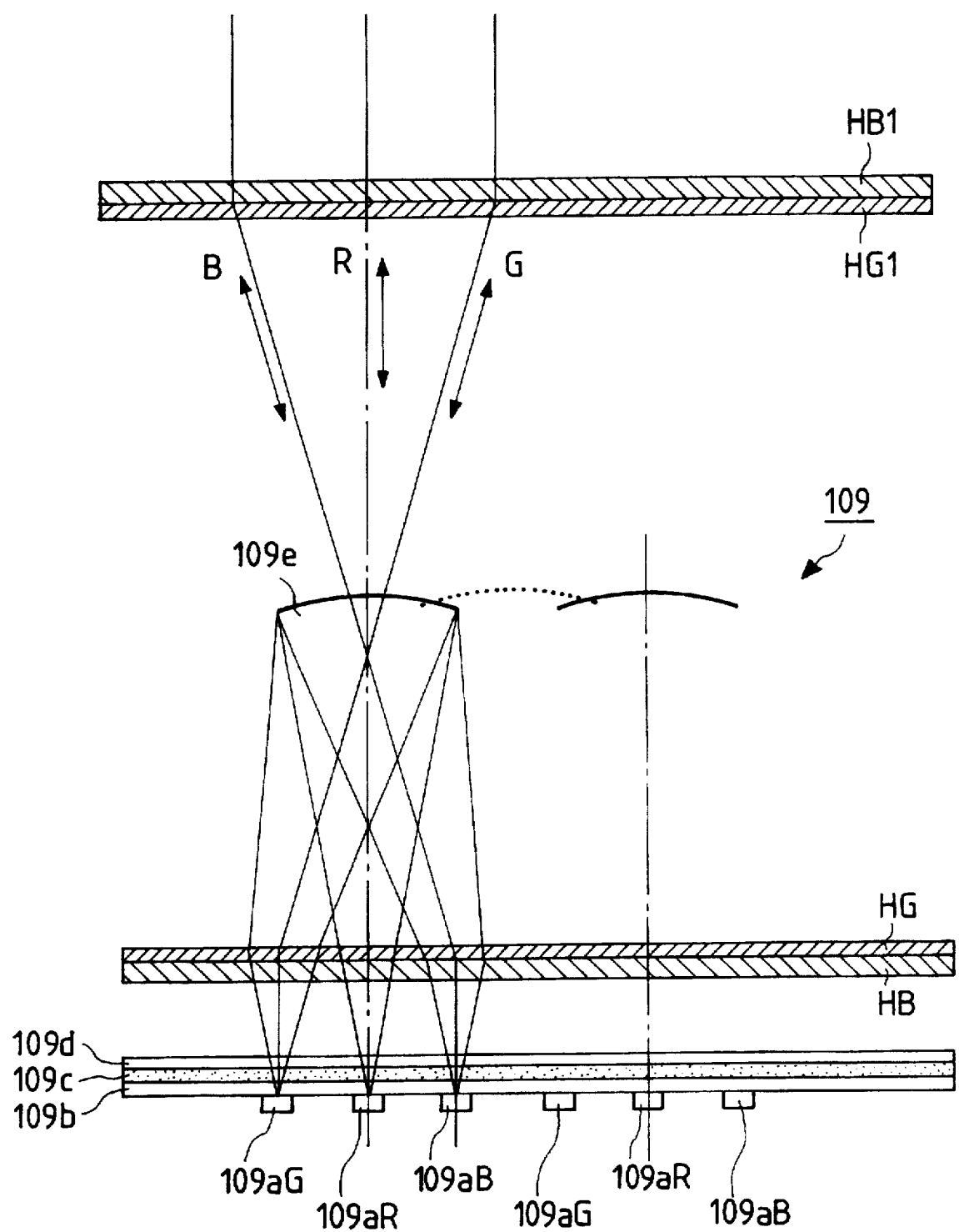
FIG. 13 is a sectional view of a spatial light modulation device and hologram layers in a color display apparatus according to a tenth embodiment of this invention.

A tenth embodiment of this invention is similar to the third embodiment thereof except for design changes indicated later. The tenth embodiment uses a total reflection mirror (not shown) in place of the dichroic mirrors 111, 112, and 113 (see FIG. 3). With reference to FIG. 13, the tenth embodiment includes a hologram layers HB1 and HG1 located between a polarization beam splitter 106 (see FIG. 3) and a spatial light modulation device 109.

The hologram layers HB1 and HG1 diffract and deflect blue light and green light in different directions respectively. Red light passes through the hologram layers HB1 and HG1 without being diffracted and deflected thereby.

With reference to FIG. 13, a forward white light beam successively passes through the hologram layers HB1 and HG1. Blue components of the forward white light beam are diffracted and deflected by the hologram layer HB1 when passing therethrough. Green components of the forward white light beam are diffracted and deflected by the hologram layer HG1 when passing therethrough. Red components of the forward white light beam are neither diffracted nor deflected when passing through the hologram layers HB1 and HG1. Accordingly, the hologram layers HB1 and HG1 separate the forward white light beam into a forward blue light beam "B", a forward green light beam "G", and a forward red light beam "R" which travel along different directions respectively.

Then, the forward blue light beam "B", the forward red light beam "R", and the forward green light beam "G" travel to a micro lens 109e in the spatial light modulation device 109. The forward blue light beam "B", the forward red light beam "R", and the forward green light beam "G" pass through the micro lens 109e while being condensed or focused thereby. Subsequently, the forward blue light beam "B", the forward red light beam "R", and the forward green light beam "G" travel from the micro lens 109e to a hologram layer HG. Then, the forward blue light beam "B", the forward red light beam "R", and the forward green light beam "G" successively pass through the hologram layer HG and a hologram lens HB. The forward green light beam "G" is diffracted and deflected by the hologram layer HG, being incident to a region of a liquid crystal layer 109c, directly above a green pixel electrode 109aG, at substantially a right angle. The forward blue light beam "B" is diffracted and deflected by the hologram layer HB, being incident to a region of the liquid crystal layer 109c, directly above a blue pixel electrode 109aB, at substantially a right angle. The forward red light beam "R" is diffracted and deflected by none of the hologram layers HG and HB, being incident to a region of the liquid crystal layer 109c, directly above a red pixel electrode 109aR, at substantially a right angle. The forward green light beam "G", the forward blue light beam "B", and the forward red light beam "R" travel through the liquid crystal layer 109c before being reflected by a dielectric mirror layer 109b. Then, the green light beam "G", the blue light beam "B", and the red light beam "R" return along the paths substantially same as those of the forward travel thereof. The return green light beam "G", the return blue light beam "B", and the return red light beam "R" leave the spatial light modulation device 109.

It should be noted that the hologram layers HB1 and HG1 may be laminated on a glass substrate (not shown) of the spatial light modulation device 109.

What is claimed is:

1. A color display apparatus comprising:

an array of color pixels including light modulation portions respectively;

first and second holograms being parallel to the array of the color pixels, the second hologram extending between the array of the color pixels and the first hologram;

means for applying an incident light beam to the first hologram along substantially a normal direction with respect to the first hologram;

wherein the first hologram diffracts the incident light beam into a diffraction-resultant light beam, and directs the first diffraction-resultant light beam in a direction oblique relative to the first hologram, wherein the second hologram diffracts the first diffraction-resultant light beam into a second diffraction-resultant light beam having a plurality of light beams with different wavelengths respectively, and the second hologram directs the different wavelength light beams toward the color pixels respectively, and wherein the light modulation portions in the color pixels modulate the different wavelength light beams into modulation-resultant light beams respectively;

a screen;

means for projecting the modulation-resultant light beams into a color image on the screen;

wherein the modulation-resultant light beams reflect at the color pixels respectively, and then travel back through the second hologram and the first hologram while being diffracted by the second hologram and the first hologram into a third diffraction-resultant light beam, and wherein the projecting means comprises means for projecting the third diffraction-resultant light beam into a color image on the screen.

2. A color display apparatus comprising:

a light source emitting a light beam;

first means for separating the light beam emitted from the light source into red, green, and blue light beams;

a spatial light modulation device exposed to the red, green, and blue light beams generated by the first means, the spatial light modulation device modulating the red, green, and blue light beams into red, green, and blue modulation-resultant light beams respectively; and second means for projecting the red, green, and blue modulation-resultant light beams generated by the spatial light modulation device into a color image;

wherein the spatial light modulation device comprises:

i) a first electrode being transparent and being exposed to the red, green, and blue light beams generated by the first means;

ii) a second electrode including first, second, and third pixel electrodes related to red, green, and blue respectively;

iii) a light modulation layer extending between the first electrode and the second electrode;

iv) an array of micro lenses which focus the red, green, and blue light beams generated by the first means on the first, second, and third pixel electrodes respectively; and v) third means located between the micro lens array and the second electrode for deflecting the red, green, and blue light beams outputted from the micro lens array in substantially normal directions with respect to the first, second, and third pixel electrodes respectively, the third means including a laminate of a first hologram layer and a second hologram layer, the first hologram layer diffracting only the green light beam and directing the green light beam in substantially a normal direction with respect to the second pixel electrode, the second hologram layer diffracting only the blue light beam and directing the blue light beam in substantially a normal direction with respect to the third pixel electrode.

3. A color display apparatus comprising:

a light source emitting a light beam;

first means for separating the light beam emitted from the light source into red, green, and blue light beams;

a spatial light modulation device exposed to the red, green, and blue light beams generated by the first means, the spatial light modulation device modulating the red, green, and blue light beams into red, green, and blue modulation-resultant light beams respectively; and second means for projecting the red, green, and blue modulation-resultant light beams generated by the spatial light modulation device into a color image;

wherein the spatial light modulation device comprises:

i) a first electrode being transparent and being exposed to the red, green, and blue light beams generated by the first means;

ii) a second electrode including first, second, and third pixel electrodes related to red, green, and blue respectively;

iii) a light modulation layer extending between the first electrode and the second electrode;

iv) an array of micro lenses which focus the red, green, and blue light beams generated by the first means on the first, second, and third pixel electrodes respectively; and v) third means located between the micro lens array and the second electrode for deflecting the red, green, and blue light beams outputted from the micro lens array in substantially normal directions with respect to the first, second, and third pixel electrodes respectively, the third means including a first hologram layer and a second hologram layer, the first hologram layer extending in a path of the green light beam, the first hologram layer diffracting the green light beam and directing the green light beam in substantially a normal direction with respect to the second pixel electrode, the second hologram layer extending in a path of the blue light beam, the second hologram layer diffracting the blue light beam and directing the blue light beam in substantially a normal direction with respect to the third pixel electrode.

4. A color display apparatus comprising:

a light source emitting a light beam;

first means for separating the light beam emitted from the light source into first, second, and third light beams having first, second, and third primary colors respectively;

a spatial light modulation device exposed to the first, second, and third light beams generated by the first means, the spatial light modulation device modulating the first, second, and third light beams into first, second, and third modulation-resultant light beams respectively; and second means for projecting the first, second, and third modulation-resultant light beams generated by the spatial light modulation device into a color image;

wherein the spatial light modulation device comprises:

i) a first electrode being transparent and being exposed to the first, second, and third light beams generated by the first means;

ii) a second electrode including first, second, and third pixel electrodes related to the first, second, and third primary colors respectively;

iii) a light modulation layer extending between the first electrode and the second electrode;

iv) an array of first micro lenses focusing the first, second, and third light beams generated by the first means on the first, second, and third pixel electrodes respectively, the first micro lenses having a predetermined focal length f1 and a principal plane; and v) third means located between the second electrode and the array of the first micro lenses for deflecting the first, second, and third light beams outputted from the array of the first micro lenses in substantially normal directions with respect to the first, second, and third pixel electrodes respectively, the third means including an array of second, third, and fourth micro lenses corresponding to the first, second, and third light beams respectively, the second, third, and fourth micro lenses having a predetermined focal length f2 and a principal plane which is separate from the principal plane of the first micro lenses by a distance equal to the sum of the predetermined focal lengths f1 and f2.

5. A color display apparatus comprising:

a light source emitting a light beam;

first means for separating the light beam emitted from the light source into first, second, and third light beams having first, second, and third primary colors respectively;

a spatial light modulation device exposed to the first, second, and third light beams generated by the first means, the spatial light modulation device modulating the first, second, and third light beams into first, second, and third modulation-resultant light beams respectively; and second means for projecting the first, second, and third modulation-resultant light beams generated by the spatial light modulation device into a color image;

wherein the spatial light modulation device comprises:

i) a first electrode being transparent and being exposed to the first, second, and third light beams generated by the first means;

ii) a second electrode including first, second, and third pixel electrodes related to the first, second, and third primary colors respectively;

iii) a light modulation layer extending between the first electrode and the second electrode;

iv) an array of first micro lenses focusing the first, second, and third light beams generated by the first means on the first, second, and third pixel electrodes respectively, the first micro lenses having a principal plane; and v) third means located between the second electrode and the array of the first micro lenses for deflecting the first, second, and third light beams outputted from the array of the first micro lenses in substantially normal directions with respect to the first, second, and third pixel electrodes respectively, the third means including an array of second micro lenses aligning with the first micro lenses respectively, the second micro lenses having a predetermined focal length f3 and a principal plane which is separate from the principal plane of the first micro lenses by a distance equal to the predetermined focal length f3.

* * * * *